(12) United States Patent
Kodosky (10) Patent No.: US 8,448,135 B2
(45) Date of Patent: May 21, 2013

(54) RACE STRUCTURE FOR A GRAPHICAL PROGRAM

(75) Inventor: Jeffrey L. Kodosky, Austin, TX (US)

(73) Assignee: National Instruments Corporation, Austin, TX (US)

( * ) Notice: Subject to any disclaimer, the term of this patent is extended or adjusted under 35 U.S.C. 154(b) by 653 days.

(21) Appl. No.: 12/752,606

(22) Filed: Apr. 1, 2010

(65) Prior Publication Data

US 2011/0246963 A1   Oct. 6, 2011

(51) Int. Cl.
*G06F 9/44* (2006.01)

(52) U.S. Cl.
USPC ............... 717/119; 717/149; 703/4; 703/13; 703/22

(58) Field of Classification Search
USPC .......................................................... 717/119
See application file for complete search history.

(56) References Cited

U.S. PATENT DOCUMENTS

| | | | | |
|---|---|---|---|---|
| 4,914,568 A * | 4/1990 | Kodosky et al. | ............... | 715/763 |
| 5,481,741 A * | 1/1996 | McKaskle et al. | ............ | 345/522 |
| 6,173,438 B1 * | 1/2001 | Kodosky et al. | ............... | 717/109 |
| 6,593,940 B1 * | 7/2003 | Petersen et al. | ............... | 715/700 |
| 6,715,139 B1 * | 3/2004 | Kodosky et al. | ............... | 717/125 |
| 6,920,634 B1 * | 7/2005 | Tudor | ............................ | 718/107 |
| 7,673,295 B1 * | 3/2010 | Lin | ............................... | 717/156 |
| 7,992,146 B2 * | 8/2011 | Krauss | ............................ | 718/100 |
| 8,136,158 B1 * | 3/2012 | Sehr et al. | ......................... | 726/22 |
| 2003/0196187 A1 * | 10/2003 | Kodosky et al. | ............... | 717/109 |
| 2006/0212877 A1 * | 9/2006 | Grunkemeyer et al. | ....... | 719/313 |
| 2007/0067762 A1 * | 3/2007 | Wadsworth et al. | ........... | 717/149 |
| 2007/0129819 A1 * | 6/2007 | Peck et al. | ........................ | 700/18 |
| 2008/0126278 A1 * | 5/2008 | Bronstein et al. | ................ | 706/17 |

OTHER PUBLICATIONS

National Instruments. Parallel Programming for Everyone—Take Advantage of Multicore CPUs with LabVIEW. Feb. 2, 2010. <available at NI.com>.*
National Instruments. Multithreaded Features of LabVIEW Functions and Drivers. Oct. 30, 2007. <available at NI.com>.*
The Mathworks Inc. Using Simulink Version 3. copyright 1990-1999.*

* cited by examiner

*Primary Examiner* — Wei Zhen
*Assistant Examiner* — Matthew Brophy
(74) *Attorney, Agent, or Firm* — Meyertons Hood Kivlin Kowert & Goetzel, P.C.; Jeffrey C. Hood; Mark S. Williams (57) ABSTRACT

System and method for executing a graphical program. A first structure in a graphical program is displayed on a display. The first structure includes two or more frames, each configured to contain a respective portion of the graphical program. The respective portions of the graphical program are included in the two or more frames. During execution of the graphical program, the first structure executes the respective portions of the graphical program in the two or more frames in parallel via respective execution processes. When a first portion of the respective portions completes execution prior to all others of the portions, execution of the other portions is terminated.

20 Claims, 9 Drawing Sheets

RACE STRUCTURE FOR A GRAPHICAL PROGRAM

FIELD OF THE INVENTION

The present invention relates to the field of graphical programming, and more particularly to a race structure for a graphical program.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

LabVIEW graphical programs may be implemented as data flow programs, where the program architecture is that of a directed graph specifying the flow of data through the program, and so functions execute whenever the necessary input data are available, as opposed to procedural programs, which specify an execution flow of computations to be performed. Thus, data flow programs are particularly suited for parallel execution, e.g., multiple execution threads executing on multiple processor cores, e.g., distributed across multiple networked devices.

SUMMARY OF THE INVENTION

Various embodiments of a system and method for performing parallel program functionality via a race structure for a graphical program are presented below.

A graphical program may be displayed on a display, e.g., of a computer. In some embodiments, the graphical program may be or include a graphical data flow program. The graphical program may implement any functionality desired, including, for example, an industrial automation function, a process control function, or a test and measurement function, among others, as mentioned above. The graphical program may comprise a plurality of interconnected nodes or icons which visually indicate the functionality of the graphical program, and may include a block diagram (that includes the interconnected nodes) and may also include a user interface portion or front panel portion.

A first structure, e.g., a race structure, in a graphical program may be displayed on a display, e.g., of a computer. In one embodiment, the first structure may include two or more frames, each configured to contain a respective portion of the graphical program, i.e., a graphical program portion, i.e., a graphical code portion. The first structure may be implemented in any of a variety of ways. For example, in one embodiment, the frames of the structure may be or include graphical frames that visually delineate any graphical program code contained in each frame from graphical program code in other frames (and the rest of the graphical program).

The respective portions of the graphical program may be included in the two or more frames, e.g., in response to user input. For example, the user may drag and drop one or more graphical program elements, e.g., nodes, into a frame from a palette, and may connect or wire the graphical program elements to other elements in the frame, the frame itself, or possibly graphical program elements outside the frame. Additionally, or alternatively, the user may select a graphical program portion, e.g., from the graphical program currently being developed, from another graphical program, or from a library of such graphical code portions, and include the portion in the frame, e.g., by dragging and dropping the portion into the frame. In other embodiments, the graphical program code (portions of the graphical program) may be included in the frames in any manner desired. For example, in some embodiments, the graphical code portions may included in the frames programmatically, e.g., automatically via software, i.e., without direct user input.

In some embodiments, displaying the first structure may include displaying at least one frame of the two or more frames, including displaying the graphical program portion within the at least one frame. Each frame may include a border, e.g., a rectangular boundary, delineating an internal portion wherein the contained graphical program code may be displayed, although other means of delineation may be used as desired. Note that in various embodiments, the frames (and their corresponding graphical program code) may or may not be displayed in the graphical program.

In various embodiments, one or more of the frames may be displayed at a time. For example, in one embodiment, only one frame may be visible at a time, where the user may select which frame is viewable, e.g., which frame is "on top". The user may thus tab or page through each frame to view the frame and its corresponding graphical program portion. In other embodiments, multiple, and possibly all, frames may be displayed at once. For example, the frames may be displayed horizontally or vertically, or even as a 2-dimensional array, e.g., four frames may be displayed as a 2×2 grid of frames. In a further embodiment, multiple frames may be cascaded, e.g., partially overlapping, whereby the user can "click" on a visible portion of any frame to bring it to the front or top for viewing. Note that these embodiments are meant to be exemplary only, and that the frames may be displayed in any manner desired. In one embodiment, the structure may be expandable or collapsible based on user input, where in its collapsed state, the structure is displayed as a single node without displaying any of the frames or corresponding code, and in its expanded state, the structure displays one or more frames and code portions.

During execution of the graphical program, the first structure may execute the respective portions of the graphical program in the two or more frames in parallel via respective execution processes, where when a first portion of the respective portions completes execution prior to all others of the portions, execution of the other portions is terminated. In other words, the first structure may be configured to execute the graphical program portions in each frame in parallel, i.e., concurrently, where in response to a graphical program portion completing execution first (i.e., before any of the other portions), the structure terminates execution of the other portions. This functionality is referred to herein as "preemptive", in that each of the executing portions may be considered to be in competition, e.g., to provide their respective outputs to the graphical program, where the first portion to complete "wins", thus functionally preempting the other portions; hence the name "race structure", although any other name may be used as desired. For example, such a structure may also be referred to as a preemptive parallel task structure, among other names.

Thus, in one embodiment, the method may include executing the graphical program, including executing the first structure, which may include executing the respective portions of the graphical program in the two or more frames in parallel via the respective execution processes, and in response to a first portion of the respective portions completing execution prior to all others of the portions, terminating execution of the other portions. Note that as used herein, executing program code portions in parallel or concurrently refers to overlapping execution of the program code portions. In other words, at least some of the respective program code portions executes at the same time.

Note that in various embodiments, the respective execution processes may be implemented via respective execution threads, respective processors, or respective processing cores. Note further that the respective execution processes may be in a single device, or may be distributed over multiple devices, e.g., coupled via a network.

In one embodiment, at least two of the respective portions may represent substantially equivalent functionality. For example, consider an application in which some specified functionality is desired to be performed as quickly as possible, and where there are a variety of computational resources available for use, but it is unclear as to which resource would be the fastest. Graphical code (portions) implementing the desired functionality may be included in multiple frames, and each frame may be specified to execute its respective graphical code portion via a respective execution resource. In this manner, the graphical program portion that executes the fastest will be the one that is used by the graphical program. Thus, embodiments of the techniques disclosed herein may provide a flexible means for optimizing performance of an application that has access to multiple execution resources.

As noted above, in some embodiments, the first structure, e.g., the race structure, disclosed herein may be used in nested fashion. In other words, the graphical code portion in a frame of a race structure may itself include a race structure, and so on, where, for example, one or more of the graphical program portions executing in parallel may themselves be executed in parallel. In this manner, for example, execution of an application in a massively parallel and possibly heterogeneous computational system may be optimized (execution timewise) on the fly. Said another way, in execution systems rich in computational resources, a form of "brute force" parallelism, where substantially the same program code is executed multiple times concurrently, but only one "instance" is ultimately used, may be leveraged to achieve optimal performance at runtime without the need to design or implement a specific optimization scheme, e.g., a scheme based on analysis of the program or available resources.

In a related but slightly different approach, the functionality being replicated in the frames may be implemented using different algorithms or code designs. Thus, for example, each implementation or algorithm may compete at runtime to provide the desired functionality. Such algorithmic competition may be particularly useful when the optimality of an algorithm depends on the particular data being operated on. In other words, different data sets may result in different efficiencies or effectiveness of the algorithms, and so the techniques disclosed herein may be used to facilitate competition among different algorithms, where at runtime, the fastest algorithm or implementation "wins", and thus is the one that is "used" by the graphical program. Similarly, the effectiveness or efficiency of algorithms may depend upon the computational resources used, and so Note that in other embodiments, the above approaches may be used together, e.g., where a plurality of frames specify concurrent execution of multiple algorithms and the use of multiple execution processes, which themselves may include multiple processes, as desired. In other words, the frames may specify and implement competition among algorithms or code designs and/or among computational resources, as desired.

Note that this technique may also be applied to "nonterminating" application execution, i.e., where the application runs continuously, where the application invokes execution of other programs or subprograms that utilize embodiments of the structure disclosed herein.

Thus, various embodiments of the techniques disclosed herein may facilitate parallel functionality in graphical programs.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Model of Computation (or Computational Model)—a model for visually specifying or visually representing program code to a user. A "model of computation" may also be considered as a set of program semantics of a programming language. Examples of "models of computation" include various forms of graphical data flow, such as data driven data flow (e.g., LabVIEW), demand driven data flow, and statically-scheduled data flow (including, but not limited to, synchronous data flow, heterochronous data flow, cyclo-static data flow, parameterized synchronous data flow, and discrete time data flow); synchronous reactive; process network; state diagram; control flow diagram; simulation diagram models (continuous time simulation data flow); various forms of text-based code (such as Matlab and MathScript, C, C++, etc.); and/or physical simulation (including physical domains such as circuits, hydrodynamics, mechanics, device modeling, thermodynamics, etc.), among others. "Statically-scheduled data flow" is data flow in which the firing pattern (i.e. execution order) of nodes is data-independent and can, therefore, be determined before run-time, e.g. at compile time. A "process network" is a set of deterministic sequential processes communicating through FIFO channels. "Synchronous reactive" can refer to a program where operations are given a certain amount of time to react, and if this constraint holds, the rest of the system appears synchronous.

A program portion may be visually represented on a display in a first computational model, but may in fact be actually implemented in the computer using a different computational model that may be hidden from the user. For example, Matlab is a text-based scripting language that is implanted in the C programming language. As another example, MathScript is a text-based scripting language implemented in the LabVIEW graphical programming language. A program portion may be represented in a first model of computation to provide a more intuitive visual representation of the functionality of the program portion, e.g., to allow the user to more readily understand and/or edit the program portion.

Figure 1A:
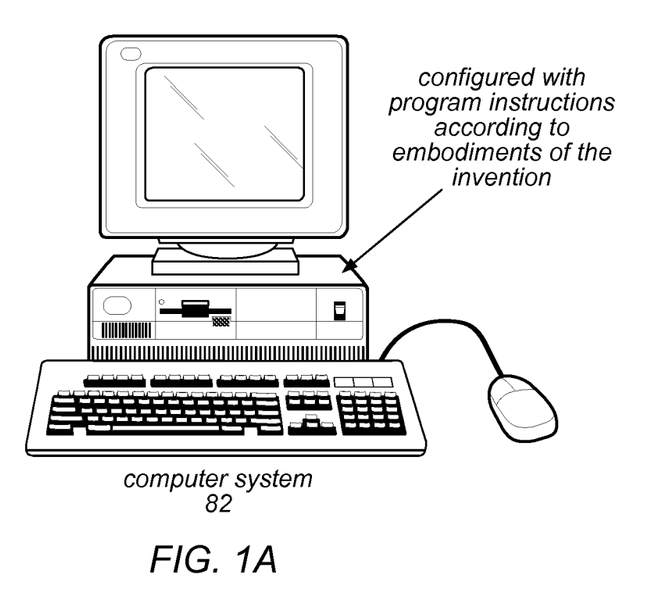
FIG. 1A illustrates a computer system configured to execute a graphical program according to an embodiment of the present invention.

FIG. 1A—Computer System

FIG. 1A illustrates an exemplary computer system 82 configured to implement an embodiment of the invention. Embodiments of a method for executing a graphical program are described below.

As shown in FIG. 1A, the computer system 82 may include a display device configured to display the graphical program as the graphical program is created, edited, analyzed and debugged, and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store a graphical programming development environment application used to create and/or execute graphical programs. Additionally, the memory medium may store one or more programs, e.g., graphical programs, which are executable to perform the methods described herein, e.g., under or as part of the graphical programming development environment application. The memory medium may also store operating system software, as well as other software for operation of the computer system. Various embodiments further include receiving or storing instructions and/or data implemented in accordance with the foregoing description upon a carrier medium.

Figure 1B:
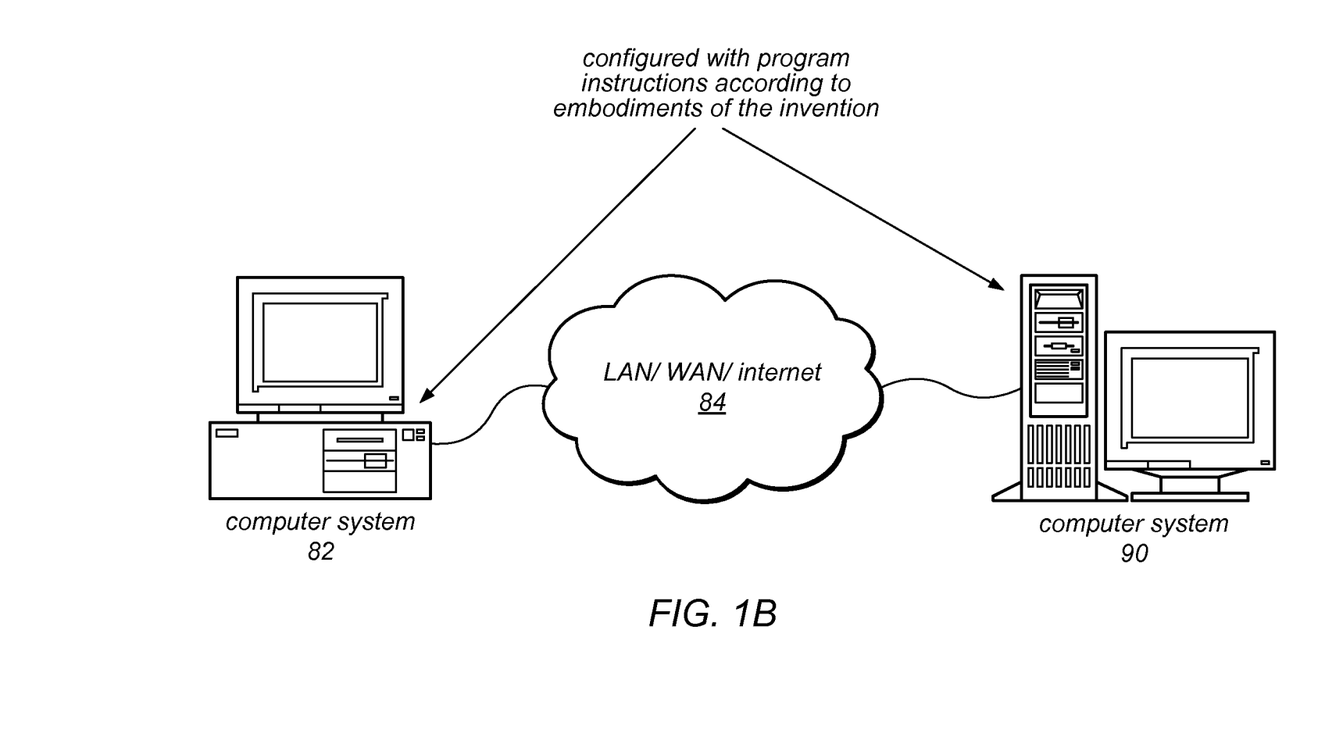
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program implementing one embodiment of the invention, e.g., a graphical program development environment that provides a race structure for use in developing graphical programs. For example, computer 82 may display a user interface for the development environment, and computer system 90 may execute the application portion of the development environment and/or the block diagram of the developed graphical program. As another example, computer 82 may display the graphical user interface of the development environment and/or the graphical program and computer system 90 may execute the application portion of the development environment and/or the block diagram of the graphical program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others. For example, the graphical programs developed using the techniques described herein may be used in any of such industrial applications.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

It should be further noted that as used herein, the term "or" is intended to be inclusive, i.e., means "and/or". Cases where "exclusive or" (i.e., "XOR") is intended will be explicitly indicated.

Figure 2A:
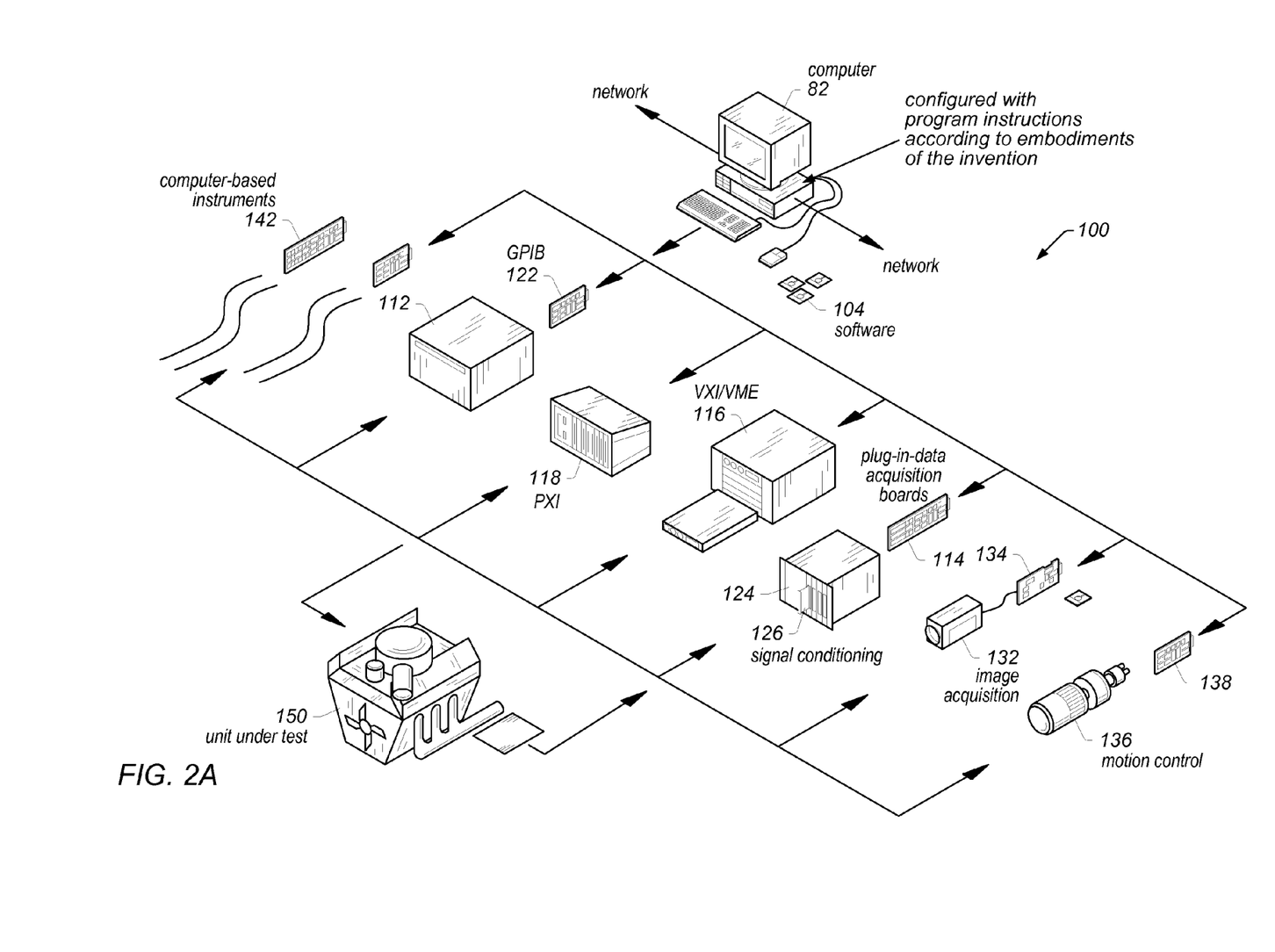
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
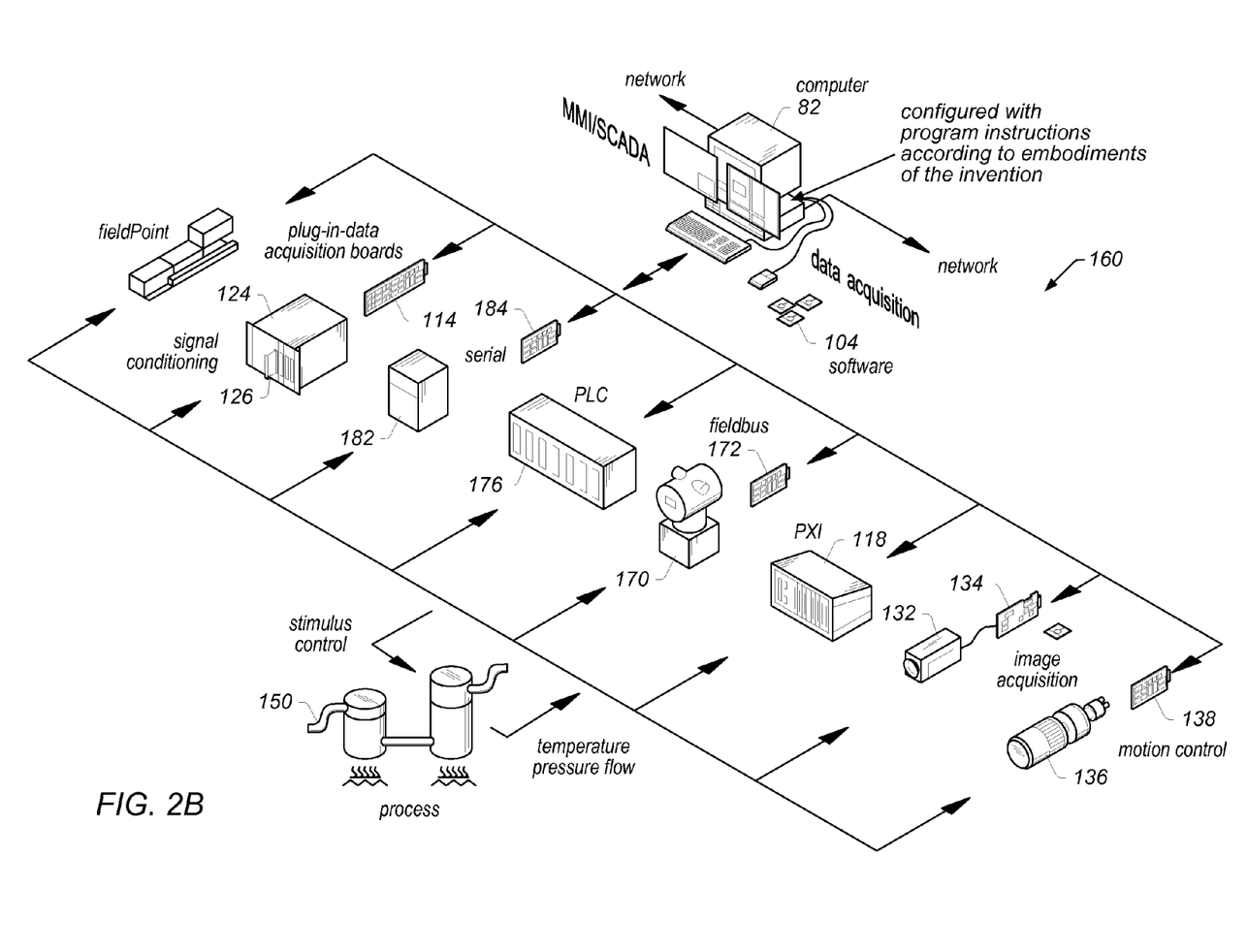
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
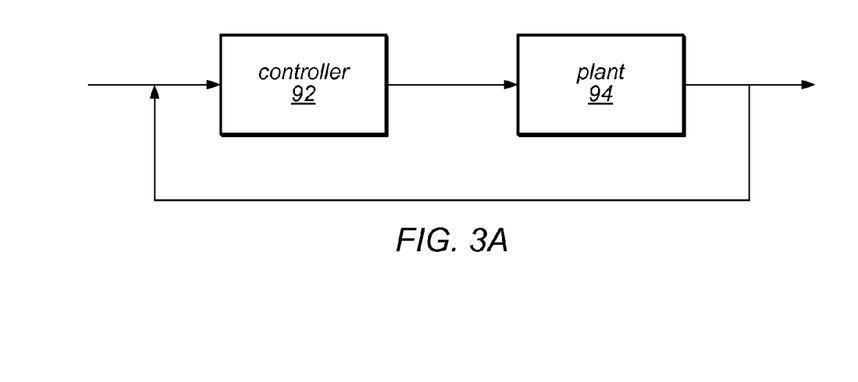
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
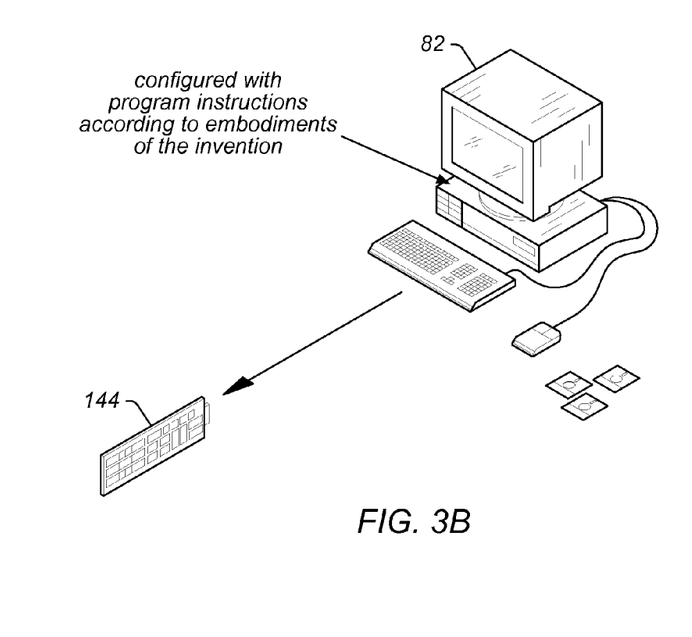
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may develop a graphical program on a computer using the techniques disclosed herein, and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
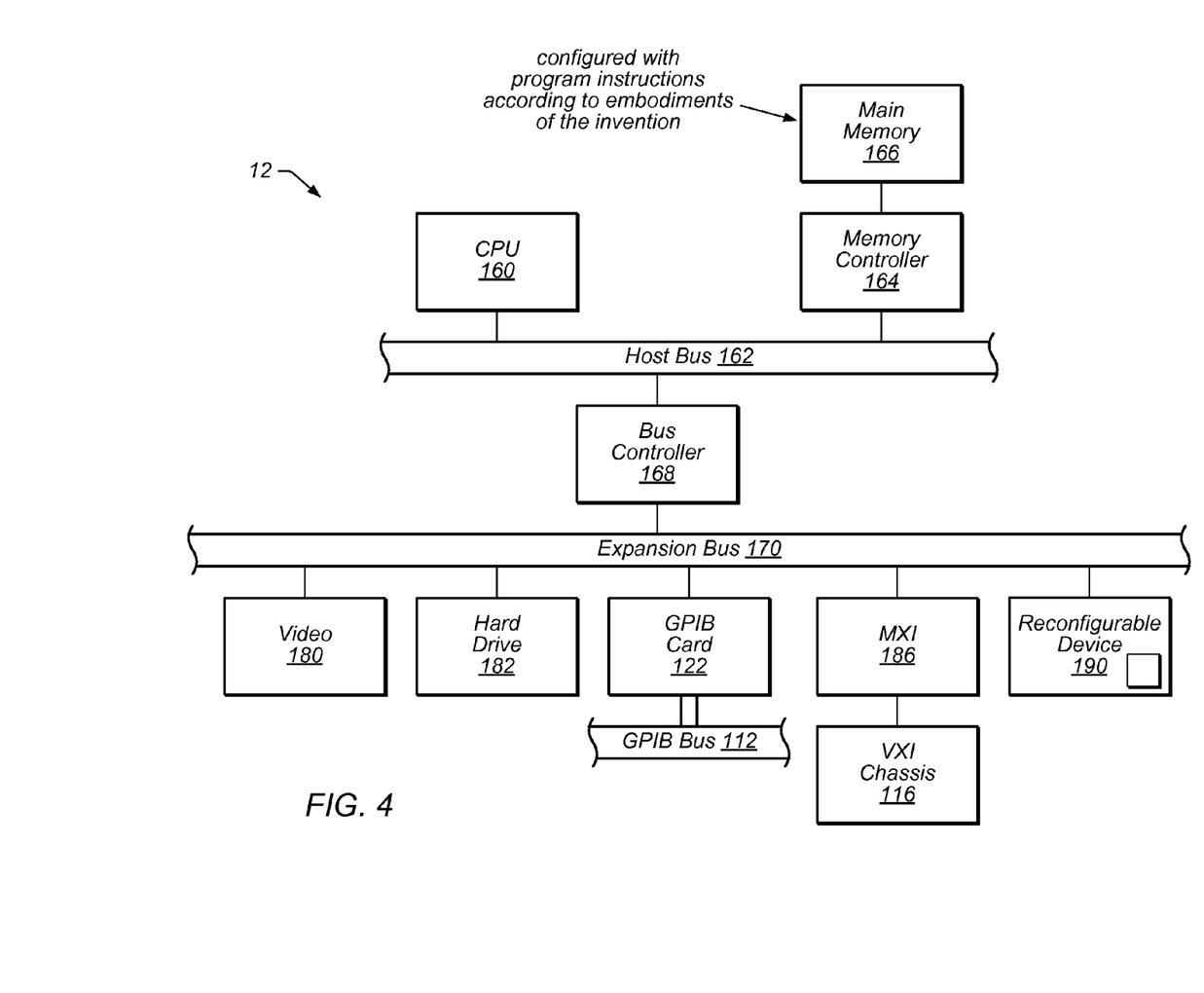
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program development environment, according to one embodiment of the invention, as well as one or more graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
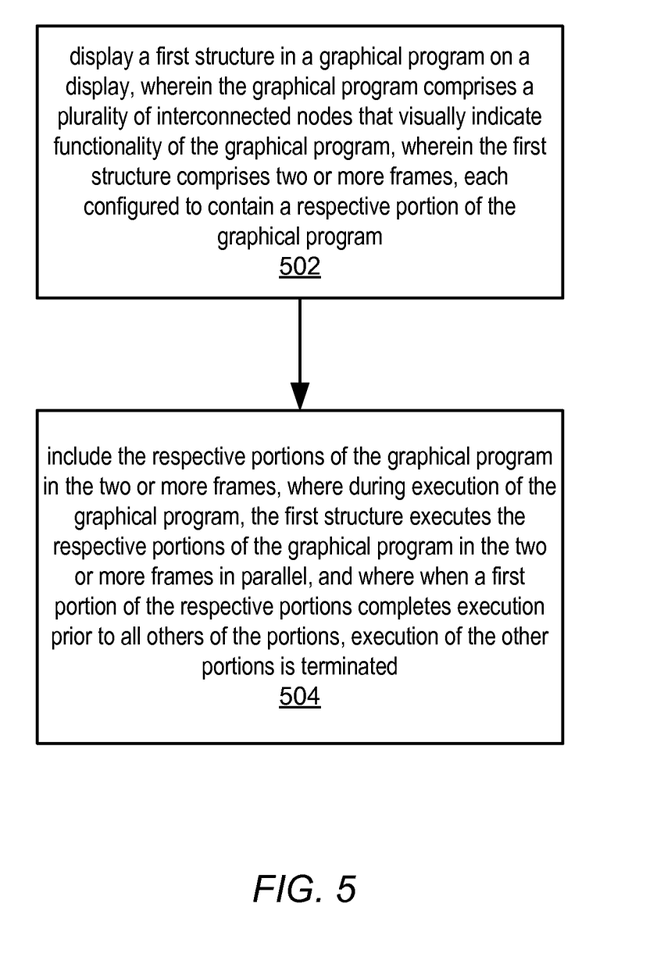
FIG. 5 is a flowchart diagram illustrating one embodiment of a method for executing a graphical program.

FIG. 5—Flowchart of a Method for Executing a Graphical Program

FIG. 5 flowcharts a method for executing a graphical program. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a first structure in a graphical program may be displayed on a display, e.g., of computer 82 (or on a different computer). In one embodiment, the first structure may include two or more frames, each configured to contain a respective portion of the graphical program, i.e., a graphical program portion, i.e., a graphical code portion. The first structure may be implemented in any of a variety of ways. For example, in one embodiment, the frames of the structure may be or include graphical frames that visually delineate any graphical program code contained in each frame from graphical program code in other frames (and the rest of the graphical program).

In some embodiments, the graphical program may be created on the computer system 82 (or on a different computer system), may be retrieved from memory, or may be received from an external source. In some embodiments, the graphical program may be or include a graphical data flow program. The graphical program may implement any functionality desired, including, for example, an industrial automation function, a process control function, or a test and measurement function, among others, as mentioned above.

The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicate the functionality of the graphical program. The graphical program may comprise a block diagram (that includes the interconnected nodes) and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In 504, the respective portions of the graphical program may be included in the two or more frames, e.g., in response to user input. For example, the user may drag and drop one or more graphical program elements, e.g., nodes, into a frame from a palette, and may connect or wire the graphical program elements to other elements in the frame, the frame itself, or possibly graphical program elements outside the frame. Additionally, or alternatively, the user may select a graphical program portion, e.g., from the graphical program currently being developed, from another graphical program, or from a library of such graphical code portions, and include the portion in the frame, e.g., by dragging and dropping the portion into the frame. In other embodiments, the graphical program code (portions of the graphical program) may be included in the frames in any manner desired. For example, in some embodiments, the graphical code portions may included in the frames programmatically, e.g., automatically via software, i.e., without direct user input.

In some embodiments, displaying the first structure may include displaying at least one frame of the two or more frames, including displaying the graphical program portion within the at least one frame. Each frame may include a border, e.g., a rectangular boundary, delineating an internal portion wherein the contained graphical program code may be displayed, although other means of delineation may be used as desired. Note that in various embodiments, the frames (and their corresponding graphical program code) may or may not be displayed in the graphical program.

In various embodiments, one or more of the frames may be displayed at a time. For example, in one embodiment, only one frame may be visible at a time, where the user may select which frame is viewable, e.g., which frame is "on top". The user may thus tab or page through each frame to view the frame and its corresponding graphical program portion. In other embodiments, multiple, and possibly all, frames may be displayed at once. For example, the frames may be displayed horizontally or vertically, or even as a 2-dimensional array, e.g., four frames may be displayed as a 2×2 grid of frames. In a further embodiment, multiple frames may be cascaded, e.g., partially overlapping, whereby the user can "click" on a visible portion of any frame to bring it to the front or top for viewing. Note that these embodiments are meant to be exemplary only, and that the frames may be displayed in any manner desired. In one embodiment, the structure may be expandable or collapsible based on user input, where in its collapsed state, the structure is displayed as a single node without displaying any of the frames or corresponding code, and in its expanded state, the structure displays one or more frames and code portions.

Figure 6:
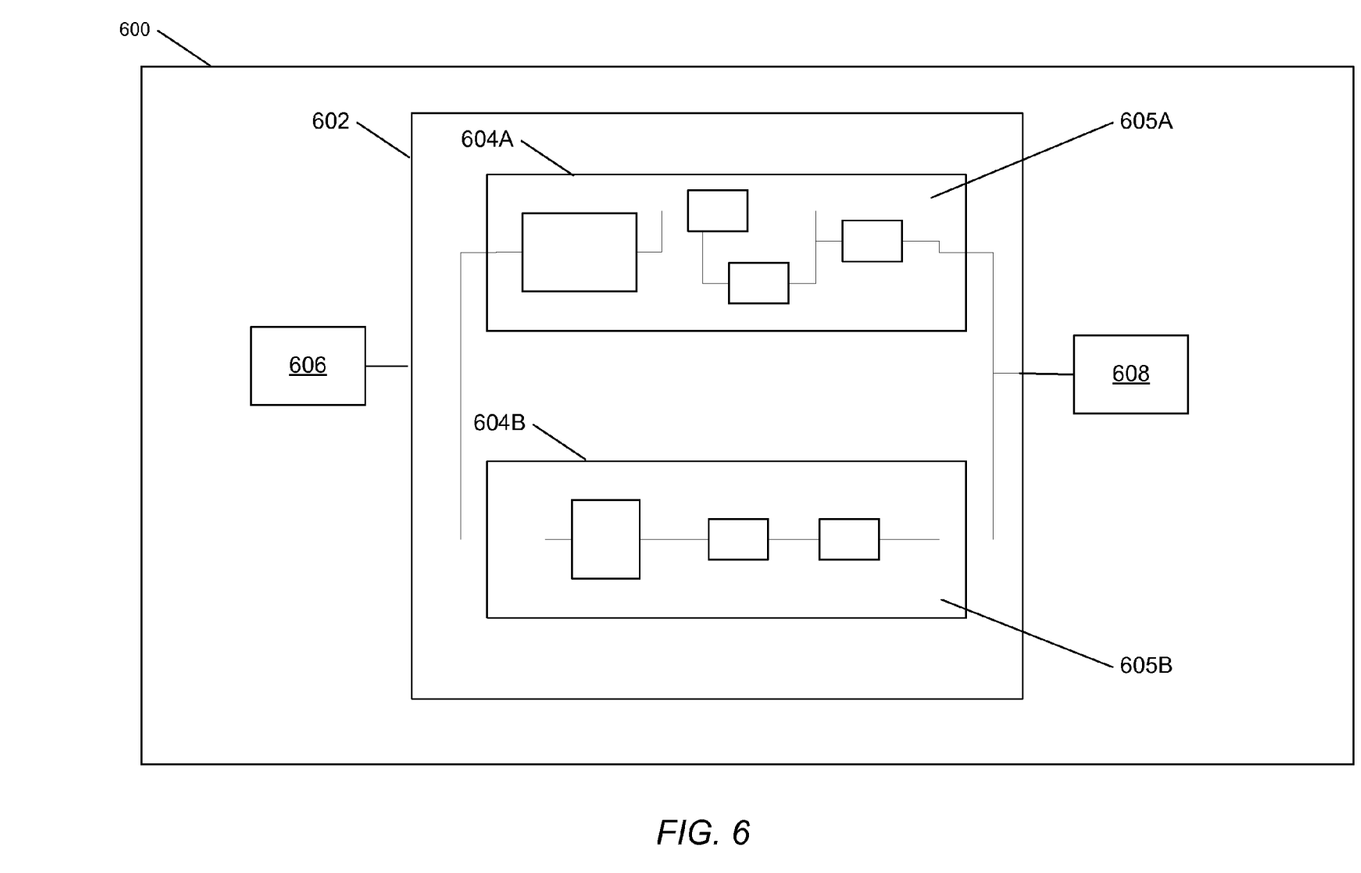
FIG. 6 illustrates an exemplary graphical program with a race structure where frames displayed in parallel, according to one embodiment.

FIG. 6 illustrates one exemplary embodiment in which a simple graphical program 600 includes a race structure 602 that includes and displays two frames 604A and 604B with corresponding graphical program code 605A and 605B. Note that the structure 602 receives input from a graphical program node 606 and provides output to graphical program node 608.

Figure 7:
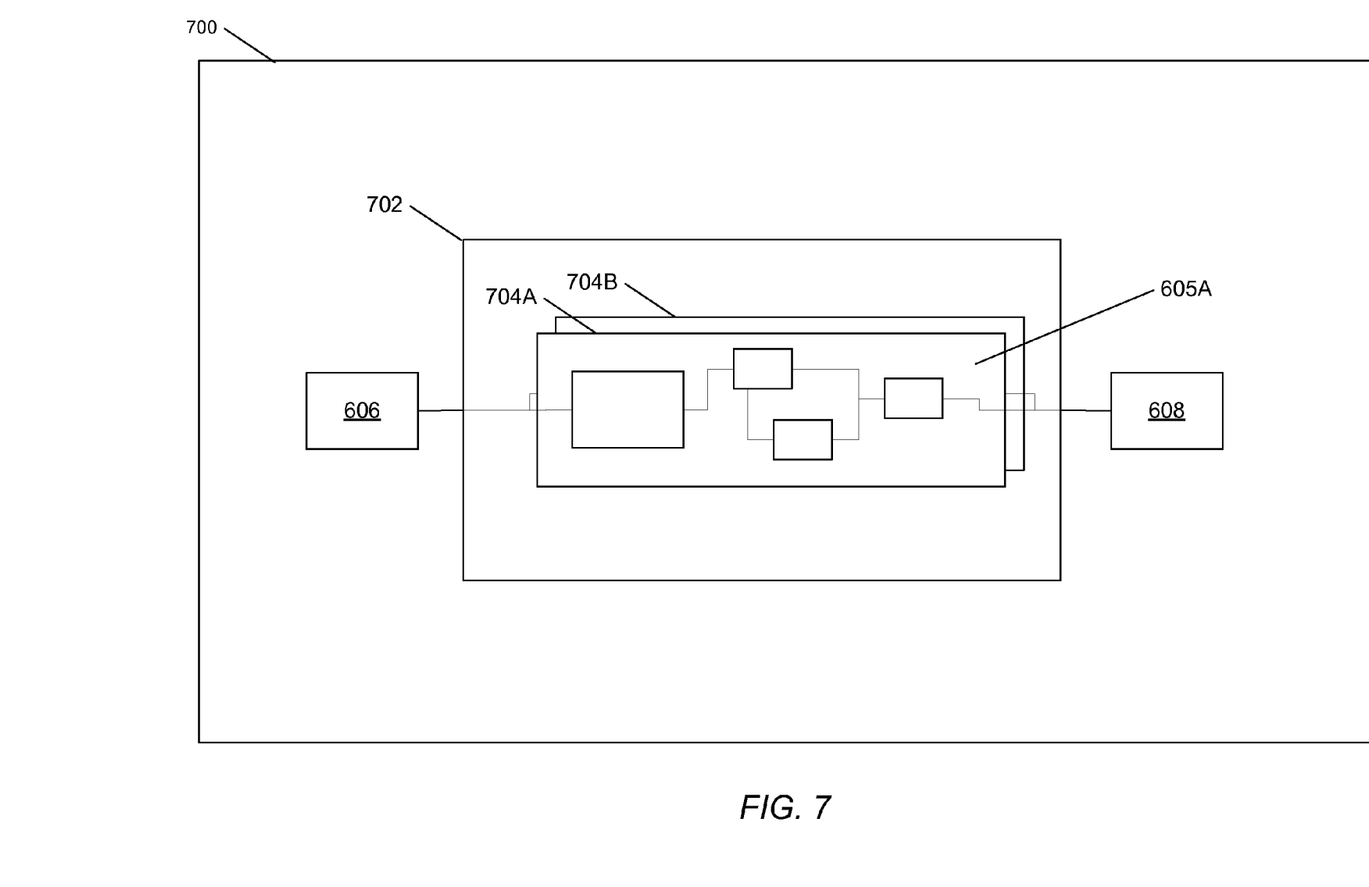
FIG. 7 illustrates another exemplary graphical program that includes a race structure in which frames are cascaded, according to one embodiment.

FIG. 7 illustrates another exemplary embodiment in which another simple graphical program 700 includes a race structure 702 that includes two frames 704A and 704B with corresponding graphical program code 605A and 605B, but where the frames are cascaded. Thus, in this embodiment, only one frame (and its code) is displayed at a time, where the use may select which frame is displayed via a pointing device, e.g., a mouse. It should be noted that the embodiments illustrated in FIGS. 6 and 7 are meant to be exemplary only, and that any other arrangement and display schemes may be used as desired. Note further that while these exemplary embodiments include structures with two frames, in other embodiments, the structures may include additional frames, nested race structures. Similarly, in other embodiments, a graphical program may include multiple such structures, e.g., serially, in parallel with one another, etc., as desired.

In some embodiments, each frame may include some designation or label whereby that frame may be easily distinguished or identified, e.g., by the user, e.g., "Algorithm A", or "Target Platform B", indicating, for example, what distinguishes that frame from the others in the structure. In various embodiments, any means of visually distinguishing frames may be used as desired.

During execution of the graphical program, the first structure may execute the respective portions of the graphical program in the two or more frames in parallel via respective execution processes, where when a first portion of the respective portions completes execution prior to all others of the portions, execution of the other portions is terminated. In other words, the first structure may be configured to execute the graphical program portions in each frame in parallel, i.e., concurrently, where in response to a graphical program portion completing execution first (i.e., before any of the other portions), the structure terminates execution of the other portions. This functionality is referred to herein as "preemptive", in that each of the executing portions may be considered to be in competition, e.g., to provide their respective outputs to the graphical program, where the first portion to complete "wins", thus functionally preempting the other portions.

Thus, in one embodiment, the method may include executing the graphical program, including executing the first structure, which may include executing the respective portions of the graphical program in the two or more frames in parallel via the respective execution processes, and in response to a first portion of the respective portions completing execution prior to all others of the portions, terminating execution of the other portions. Note that as used herein, executing program code portions in parallel or concurrently refers to overlapping execution of the program code portions. In other words, at least some of the respective program code portions executes at the same time. Note further that as used herein, executing a code portion contained in a frame may be referred to as executing the frame. Thus, one may refer to the structure executing the frames in parallel.

In some embodiments, a timer may be used to limit execution time of the structure. For example, in one embodiment, a timer may be associated with each race structure in a program, where the timer is configured with a maximum execution time. The timer may be started when the frames of the structure begin execution, and if the maximum execution time elapses before any of the frames completes execution, the structure (or graphical program) may take appropriate action, e.g., execution of all the frames may be terminated, and the condition indicated, e.g., via an error message, output code, etc.

In some embodiments, including the respective portions of the graphical program in the two or more frames may include configuring each of the two or more frames to receive one or more inputs for, and/or to provide one or more outputs from, its respective portion of the graphical program.

Thus, executing the respective portions of the graphical program in the two or more frames in parallel may include executing each respective portion in accordance with its one or more inputs, and/or providing the one or more outputs from the first portion for use by the graphical program. For example, in one embodiment, output from the structure may include an indication of which frame completed execution (and thus, whose output was used). Thus, for example, if the frame implemented "algorithm A", or executed on "platform B", this information may be output. In another embodiment, the output may further include additional information regarding the "winning" frame's execution, e.g., performance information such as the execution time of the frame, the hardware upon which the frame (code) executed, and so forth.

The respective portions of the graphical program may be configured to execute on or via respective execution processes in any of a variety of ways. For example, in one embodiment, one or more of the two or more respective portions of the graphical program may be configured to execute via respective execution processes at edit time. This configuration may be performed in response to user input, or alternatively, may be performed programmatically, i.e., automatically via executing program instructions. For example, in one embodiment, a target platform (or multiple target platforms) may be specified for the graphical program, and a discovery process (e.g., the development environment, or even edit time functionality of the structure) may determine the available execution resources of the target platform(s), e.g., via table lookup, etc., and may automatically assign the one or more frames (i.e., their contained program portions) to available execution processes of the specified target platform(s).

Alternatively, in one embodiment, one or more of the two or more respective portions of the graphical program may be configured to execute via the respective execution processes dynamically at runtime. In other words, the specific execution processes to which the respective graphical program portions (or frames) are assigned for execution may be determined at runtime, i.e., automatically, e.g., via a discovery process. For example, in one exemplary embodiment, the structure may programmatically determine the execution processes, i.e., execution resources, currently available, e.g., via a query of the target platform(s), a table, database, etc., and may dynamically allocate or assign the respective graphical program portions among the execution processes.

Note that in various embodiments, the respective execution processes may be implemented via respective execution threads, respective processors, or respective processing cores. Note further that the respective execution processes may be in a single device, or may be distributed over multiple devices, e.g., coupled via a network.

In one embodiment, at least two of the respective portions may represent substantially equivalent functionality. For example, consider an application in which some specified functionality is desired to be performed as quickly as possible, and where there are a variety of computational resources available for use, but it is unclear as to which resource would be the fastest. Graphical code (portions) implementing the desired functionality may be included in multiple frames, and each frame may be specified to execute its respective graphical code portion via a respective execution resource. In this manner, the graphical program portion that executes the fastest will be the one that is used by the graphical program. Thus, embodiments of the techniques disclosed herein may provide a flexible means for optimizing performance of an application that has access to multiple execution resources.

As noted above, in some embodiments, the race structure disclosed herein may be used in nested fashion. In other words, the graphical code portion in a frame of a race structure may itself include a race structure, and so on, where, for example, one or more of the graphical program portions executing in parallel may themselves be executed in parallel.

In this manner, for example, execution of an application in a massively parallel and possibly heterogeneous computational system may be optimized (execution time-wise) on the fly. Said another way, in execution systems rich in computational resources, a form of "brute force" parallelism, where substantially the same program code is executed multiple times concurrently, but only one "instance" is ultimately used, may be leveraged to achieve optimal performance at runtime without the need to design or implement a specific optimization scheme, e.g., a scheme based on analysis of the program or available resources.

In a related but slightly different approach, the functionality being replicated in the frames may be implemented using different algorithms or code designs. Thus, for example, each implementation or algorithm may compete at runtime to provide the desired functionality. Such algorithmic competition may be particularly useful when the optimality of an algorithm depends on the particular data being operated on. In other words, different data sets may result in different efficiencies or effectiveness of the algorithms, and so the techniques disclosed herein may be used to facilitate competition among different algorithms, where at runtime, the fastest algorithm or implementation "wins", and thus is the one that is "used" by the graphical program. Similarly, the effectiveness or efficiency of algorithms may depend upon the computational resources used, and so Note that in other embodiments, the above approaches may be used together, e.g., where a plurality of frames specify concurrent execution of multiple algorithms and the use of multiple execution processes, which themselves may include multiple processes, as desired. In other words, the frames may specify and implement competition among algorithms or code designs and/or among computational resources, as desired.

Such an approach may thus provide means for automatic flexible dynamic empirical optimization of a graphical program. For example, in one exemplary and illustrative application executed in a computational grid environment where a great number of networked heterogeneous computation resources are available, and where expense is not a primary consideration, but time-performance is to be optimal, the graphical program may be constructed (by human design and/or modified programmatically) using a hierarchy of graphical race structures, where, for example, portions of the program code amenable or targeted to concurrent processing may be distributed across frames in such structures, portions not amenable or targeted for parallel processing may be replicated in such frames, and, in addition, some portions may be implemented in multiply ways, e.g., via multiple different algorithms, and distributed in such frames. Moreover, as noted above, some portions, and the application in general may be implemented with or may utilize nested graphical race structures. In other words, in this exemplary embodiment, the entire application may be maximally optimized, performance-wise, where most, if not all, of the program functionality may be distributed and performed in a competitive manner, i.e., with multiple hardware distribution schemes and multiple algorithms and software architectures competing at many levels. In this manner, at runtime, whichever particular combination of algorithms and hardware distribution schemes, however complex or hierarchical, that produces the program output most quickly will ultimately be the source of the output.

Note that this technique may also be applied to "non-terminating" application execution, i.e., where the application runs continuously, where the application invokes execution of other programs or subprograms that utilize embodiments of the structure disclosed herein.

It should be noted that in some embodiments, the above-described race structure and its various applications and uses may be implemented in a text-based programming language, i.e., instead of a graphical programming language (or in addition to a graphical programming language). In these embodiments, the "frames" may be abstract, i.e., may not include visible borders or boundaries. For example, in one embodiment, the structure may be implemented similarly to a switch/case structure, with frames/program portions instead of "cases". More generally, the present invention is not intended to be limited to any particular form, function, or appearance, and may be implemented in any manner desired. For example, some embodiments may be implemented via programmable hardware elements, e.g., FPGAs, and so forth, as desired.

Thus, various embodiments of the techniques disclosed herein may provide for improved parallel functionality of graphical programs.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer readable memory medium that stores program instructions for executing a graphical program, wherein the program instructions are executable by a processor to implement: displaying a first structure in a graphical program on a display, wherein the graphical program comprises a plurality of interconnected nodes that visually indicate functionality of the graphical program, wherein the first structure comprises two or more frames, each configured to contain a respective portion of the graphical program; and including the respective portions of the graphical program in the two or more frames; wherein during execution of the graphical program, the first structure executes the respective portions of the graphical program in the two or more frames in parallel via respective execution processes, and wherein when a first portion of the respective portions completes execution prior to all others of the portions, execution of the other portions is terminated.

2. The non-transitory computer readable memory medium of claim 1, wherein said including comprises configuring each of the two or more frames to receive one or more inputs for, or to provide one or more outputs from, its respective portion of the graphical program.

3. The non-transitory computer readable memory medium of claim 1, wherein the program instructions are further executable to implement: executing the graphical program, including executing the first structure, comprising: executing the respective portions of the graphical program in the two or more frames in parallel via the respective execution processes; in response to a first portion of the respective portions completing execution prior to all others of the portions, terminating execution of the other portions.

4. The non-transitory computer readable memory medium of claim 3, wherein said including comprises configuring each of the two or more frames to receive one or more inputs for, or provide one or more outputs from, its respective portion of the graphical program; and wherein said executing the respective portions of the graphical program in the two or more frames in parallel comprises: executing each respective portion in accordance with its one or more inputs; or providing the one or more outputs from the first portion for use by the graphical program.

5. The non-transitory computer readable memory medium of claim 1, wherein said displaying the first structure comprises displaying at least one frame of the two or more frames, including displaying the graphical program portion within the at least one frame.

6. The non-transitory computer readable memory medium of claim 1, wherein one or more of the two or more respective portions of the graphical program are configured to execute via the respective execution processes at edit time.

7. The non-transitory computer readable memory medium of claim 1, wherein one or more of the two or more respective portions of the graphical program are configured to execute via the respective execution processes dynamically at runtime.

8. The non-transitory computer readable memory medium of claim 1, wherein the respective execution processes are implemented via one or more of: respective execution threads; respective processors; or respective processing cores.

9. The non-transitory computer readable memory medium of claim 1, wherein the graphical program comprises a graphical data flow program.

10. The non-transitory computer readable memory medium of claim 1, wherein the graphical program is configured to perform one or more of: an industrial automation function; a process control function; a test and measurement function.

11. A computer-implemented method for executing a graphical program, comprising: utilizing a computer to perform: displaying a first structure in a graphical program on a display, wherein the graphical program comprises a plurality of interconnected nodes that visually indicate functionality of the graphical program, wherein the first structure comprises two or more frames, each configured to contain a respective portion of the graphical program; and including the respective portions of the graphical program in the two or more frames; wherein during execution of the graphical program, the first structure executes the respective portions of the graphical program in the two or more frames in parallel via respective execution processes, and wherein when a first portion of the respective portions completes execution prior to all others of the portions, execution of the other portions is terminated.

12. The computer-implemented method of claim 11, wherein said including comprises configuring each of the two or more frames to receive one or more inputs for, or to provide one or more outputs from, its respective portion of the graphical program.

13. The computer-implemented method of claim 11, further comprising: utilizing the computer to perform: executing the graphical program, including executing the first structure, comprising: executing the respective portions of the graphical program in the two or more frames in parallel via the respective execution processes; in response to a first portion of the respective portions completing execution prior to all others of the portions, terminating execution of the other portions.

14. The computer-implemented method of claim 13, wherein said including comprises configuring each of the two or more frames to receive one or more inputs for, or provide one or more outputs from, its respective portion of the graphical program; and wherein said executing the respective portions of the graphical program in the two or more frames in parallel comprises: executing each respective portion in accordance with its one or more inputs; or providing the one or more outputs from the first portion for use by the graphical program.

15. The computer-implemented method of claim 11, wherein said displaying the first structure comprises displaying at least one frame of the two or more frames, including displaying the graphical program portion within the at least one frame.

16. The computer-implemented method of claim 11, wherein one or more of the two or more respective portions of the graphical program are configured to execute via the respective execution processes at edit time.

17. The computer-implemented method of claim 11, wherein one or more of the two or more respective portions of the graphical program are configured to execute via the respective execution processes dynamically at runtime.

18. The computer-implemented method of claim 11, wherein the respective execution processes are implemented via one or more of: respective execution threads; respective processors; or respective processing cores.

19. The computer-implemented method of claim 11, wherein the graphical program comprises a graphical data flow program.

20. The computer-implemented method of claim 11, wherein the graphical program is configured to perform one or more of: an industrial automation function; a process control function; a test and measurement function.

* * * * *